Patented Mar. 28, 1939

2,151,696

UNITED STATES PATENT OFFICE 2,151,696

PROCESS OF MELTING, PURIFICATION, AND RECOVERY OF METALS

George H. Goldsmith, Pawtucket, R. I.

No Drawing. Application August 10, 1936, Serial No. 95,175

20 Claims. (Cl. 75—63)

This application is a continuation in part of my co-pending application, Serial No. 4,557, filed February 1, 1935. The invention relates to a process of refining mixtures of miscellaneous ferrous and non-ferrous metals and alloys, and particularly those mixtures containing metallic iron and predominately composed of brass and bronze alloys having inclusions of aluminum, silicon and iron present therein; and has for one of its objects the removal or controlling of those constituents thereof whose presence therein renders the brasses and bronzes unsuited for producing good, sound castings.

Another object of the invention is to provide a process of treating such heterogeneous mixtures of ferrous and non-ferrous materials whereby the different undesirable elements, such as iron, silicon and aluminum commonly found as inclusions among and in the non-ferrous scrap alloys are not rapidly removed from the mixture but whereof a delayed oxidation of these impurities is effected to cause them to be continued in diminishing quantities therein and converted into useful cooperants in proportions and relationships which beneficially influence the composition and mechanical properties of the final non-ferrous casting, and without serious loss of any of the essential metal constituents of the non-ferrous alloys.

Another object of the invention is to provide a method of melting mixtures of predominantly brass or bronze alloys whereby the production of melting temperatures in the same is effected by an indirect heating medium, and in which volatilization of the tin, lead and zinc constituents of the brass or bronze will be avoided; and particularly to reduce the use of direct melting apparatus utilizing localized melting zones, such as the stack type of furnace used with direct fuel melting, or an electric furnace of the arc-type, whereby melting of the metal results by an extended exposure of the mixture to high temperatures, although my process repeatedly makes use of direct melting methods, under some circumstances.

Another object of the invention is to provide a method of melting predominantly brass and bronze scrap material in such a manner that any inclusions of free iron therewith are separated and recovered at the time of melting and withdrawal of the recovered brasses and bronzes instead of previous thereto.

Another object of the invention is to control the dissolved iron inclusions in non-ferrous metal mixtures so that it cannot form silicates or carbide compounds which are detrimental to the brass and bronze castings, which otherwise are rarely wholly free of iron under good foundry practices.

Another object of the invention is to restore the "cementite" or crystal binding action which characterizes brass and bronze alloys and which may have been destroyed by the presence or use of aluminum as an undesired constituent of the alloy materials from which the brass and bronze alloys are composed.

With these and other objects in view my invention resides in the steps of the process herein described and covered by the appended claims, and it may best be described in connection with the actual procedure to be performed in a particular application and adaptation of the invention in use; and the following is a more detailed description of such application and adaptation for illustrative purposes:

Heretofore in the preparation for melting and casting of miscellaneous ferrous and non-ferrous mixtures consisting mainly of scrap brasses and bronzes, it has been customary to give considerable attention to the diligent removal and separation of all metallic iron parts such as screws, nuts or the like, from such scrap previous to melting, by the best mechanical or physical devices which have been available, and thereafter to fuse or melt the scrap at high melting zone temperatures under conditions of directly applied heat. Furthermore, the presence of unwanted inclusions of iron carbide, slag-iron, and aluminum in crystal-upsetting form, has been considered highly detrimental as destroying what may here be referred to as the "cementite" action in the final castings of the non-ferrous base metal.

The above-mentioned undesirable inclusions existing within the scrap metal mixture comprise those which are the normal and persistent impurities of non-ferrous alloys and compounds and even when present in extremely small amounts, it is found that they render the alloys not properly useable for making sound castings since they exert a profound influence on the physical properties and structure of the final casting, rendering it relatively brittle and with a crystalline structure that is demonstrably weak under fracture tests. Furthermore, the effect of the presence even of small amounts greater than a "trace" of aluminum or aluminum compounds often is sufficient to cause these serious upsets of the crystalline structure of the cast material, besides producing detrimental upsets of the cementite thereof. By the term "cementite" is specifically meant the functional effect or action in the metals of the non-ferrous group, of the oxids of copper, tin, lead and zinc present therein as crystal binding compounds in solution therewith. Aluminum in the brasses and bronzes results in the presence of uncemented crystals that render the cast products porous and leaky unless enough aluminum is used to constitute by itself an alloyed ingredient.

However, such prior efforts have not proved successful in converting brass and bronze alloys of substantial purity with re-use of incidental foundry scrap in making safe castings so that the foundries have been driven into the use of pure ingot metal extensively, to avoid the re-entry of these unwanted inclusions of free iron, silicon and aluminum, with their various combinations, into the regular brasses and bronzes of every day use.

Thus, many foundries return their waste materials, such as gates, sprews and risers, and all machine shop brass scrap back to the metal-supply houses, in order to avoid re-use of this metal waste in the final melt with the attendant danger of iron-carbide, slag-iron, and unwanted aluminum inclusions, among the final castings.

According to my present invention, I do not attempt to physically remove or separate any of the iron present among the non-ferrous metal prior to the melting of the scrap when the iron content is ten percent or less; nor do I consider the presence of iron, silicon and aluminum at all detrimental in small amounts up to one percent by weight of the total in aluminum, but conserve the same for use in my process and carry them along to some extent with the brasses or bronzes; and in fact, if aluminum is not present in small proportion I add it in sufficient amounts to perform certain rectifying or refining operations in my process; usually to the amount of from one to five one hundredths of one percent of the whole.

If aluminum exists in the scrap metal in amounts in excess of one percent I ordinarily add more scrap brass and bronze known to be free of aluminum, but do not ordinarily pick it out from the scrap, and an approximate amount of one percent may vary greatly without harm. Scrap running high in aluminum is mixed with scrap deficient in the metal.

Furthermore, in rendering, iron, silicon, and aluminum useful, my process proposes to use the well-known affinities existing between these metals for their elimination during various combinations and compounds which they readily establish; and I utilize these affinities with very greatly increased capacity for their advantageous application in attaining my objectives, mainly by avoiding high melting zone temperatures and by deferred oxidation.

Another feature of the invention resides in my use and application of added metallic iron in circumstances where it has previously been diligently excluded in this field of brass and bronze conversion.

To this end, my process makes use of the higher melting temperature of iron as compared to that of non-ferrous metals to effect melting of the latter, and in various applications hereinafter to be described it will be apparent that by utilizing the action of such a medium, instead of rigorously eliminating the metal, I am enabled to advantageously use the iron, previously lost, particularly by using it in molten form in burning out aluminum and silicon with very short exposure to high temperatures to enable saving tin, lead and zinc.

A sound reason for using iron instead of straight copper, as a bath metal, is because iron is cheap and may be re-used over and over, while copper costs several times as much and requires virgin tin, lead, and zinc to rectify for bronze, brass, etc.

As a further feature of my invention, I propose to carry out the operation of controlling the undesired constituents of the scrap mixture, instead of removing them at once, and the final production of castings from such treated product, by two separate operating steps, each of which is applicable within a foundry wherein refining of the scrap and casting of the recovered brass and bronze alloys may be conducted on a large-scale tonnage basis, in which the first step of my process consists in heating to a red hot semi-fluid, or molten state, a mixture of ferrous and non-ferrous metals in an electric furnace under conditions whereby the reduction and control of the undesired constituents of the mixture may be effected, and melting temperatures produced therein by an indirect melting condition in which heating of the mixture is attained mainly through direct thermal transfer thereto from exposure to the action of an iron group mixture mostly metallic iron, in the molten or plastic, or red hot state, to which other metal additions such as copper may or may not be made, which results in the melted brass and bronze alloys being segregated and recovered from the combination of iron-group material and the original metal mixture. The brass and bronze mass is thereafter allowed to solidify into ingot or pig form after adding metallic aluminum, removing the surface mass of iron bath metal, slag and oxide inclusions, and by making additions of rectifying materials or mixtures such as tin, lead, zinc antimony, phosphorous, nickel, manganese, silicon, etc., to make the desired brass or bronze alloy product for casting purposes with deficiencies supplied based on the brass or bronze constitution of the original mixture and the copper or other metal supplied from the iron-bath metal components.

The solidified ingot or cast mass resulting from the above treatment will have a content of the undesirable constituents of the original metal mixture, viz., iron, silicon and aluminum, in incompletely oxidized form and in amounts up to saturation, since any excess thereabove has been drossed off prior to ingotting and by segregation and separation of the iron portion of the fluid ferrous melting vehicle added to melt the mixture, which iron mass when recovered holds a considerable part of the undesirable inclusions, as previously stated, together with any released unmelted metallic iron; and any excess of oxides of the brasses and bronzes as may be released from the melted mixture are removed by skimming. This intermediate ingot product thus formed is not fit for general direct casting purposes instead of ingotting due principally to the upset in the "cementite" action of ingot metal destroyed or partially inhibited in its crystal-binding function caused by the high percentage of included aluminum which is readily shown by fracture. Also, the amounts of the inclusions of aluminum and silicon in combined or in metallic forms within this intermediate ingot are from a hundred to a thousand times the conventional amounts in so-called pure ingot metal, which amounts are always small fractions of one percent called a trace, and usually do not exceed one one-thousandth of one percent of the whole metal.

The second operating step of my process comprises remelting the ingot or cast solidified product produced by the first step treatment, to complete the oxidation of the silicon and aluminum and re-establish the normal and usual copper, tin, lead and zinc oxide—"cementite" function and desirable crystalline structure of cast brass and bronze end-product by restoring these oxids to saturate solution; and the following is a more detailed description of the invention as above set forth:

In the practice of the invention for scrap conversion I carry out the first operating step of my process and accomplish rapid fusion or melting of the predominately non-ferrous metal scrap, preferably by employing as the final melting agency therefor what I call hereafter a bath metal, which is a high temperature melting metal, preferably mostly metallic iron, and I utilize this bath metal only under circumstances that favor its use in which it is applied in red hot, molten, or plastic form directly to contact therewith, instead of direct fuel melting or crucible melting by localized heating. Furthermore, I find the principal ability to make use of the bath metal arises from its inherent melting temperature which is much higher than that of ordinary brasses or bronzes, and by reason of this temperature characteristic and through control thereof and by mixture with metal additions I accomplish the cooperation of iron in the manner brought about in the carrying out of my process.

Hereafter I intend to designate and refer to the mixture of ferrous and non-ferrous alloys and metals to be processed by the term "crucible metals", whether the usual crucible is actually the receptacle or melting vessel used for holding the metals during the process or not; and I also have confined my process to the application of base metals and commercial alloys only, and have not applied it to precious metals due to the prohibitive expense of experimenting with them. This scrap mixture or crucible metal illustrated is composed mainly of the "common" or standard brasses or bronzes contaminated with iron parts; though the process applies in converting pure ingot metal as well.

I usually apply the bath metal in either plastic or molten form to surround or cover the crucible metal for accomplishing the thermal transfer mentioned, but it is to be understood, however, that I may carry this application of the bath metal to the crucible metal to the point of accomplishing either plasticity, fusion, or volatilization thereof; the latter result, however, being for extraneous applications only; and I may apply merely very hot but unmolten bath metal for this purpose.

In practice, I preferably add the predominately non-ferrous crucible metals into the bath metal after the latter has been melted in an electric furnace, but I may also apply the entire bath metal mixture molten or the iron portion molten, or very hot, directly to the crucible metal within a conventional melting crucible, receptacle or ladle, for accomplishing any or all of the objects of the invention. Also, I may apply the bath metal to the crucible metals which have been preheated or made plastic or molten in the crucible before applying the bath metal, sometimes with continued application of heat to the stiffened iron segregated to the top of molten crucible metal; and instead of molten iron or copper-iron I may apply red hot pellets or washers to cover the crucible metal until plastic or fused.

As a specific illustration of one manner of practicing my invention, an appropriate charge of the bath metal, mainly iron, which may or may not be mixed with a lesser content of copper or other metal constituent of the brass and bronze alloy scrap, is loaded into an electrical melting furnace of the oscillating type and brought to a plastic or molten condition. The furnace employed may comprise a conventional coreless induction furnace of the type well-known in the art in which energization is attained by high frequency power and melting of the charge is caused by the generation of heat therein due to the electrical resistance of the charge to induced current and the transformer effect while functioning a secondary coil; or it may be heated with a carbon arc flame type of electric furnace.

The composition of this bath metal which is to be applied to the crucible metals for the primary purpose of direct thermal transfer thereto preferably should be one composed predominately of pure metallic iron, preferably refined by re-use for this purpose, with as large a proportion of copper sometimes added when it is melted, as may be usefully included in the desired alloy constituents of the final crucible metal, and with such amounts of silica and alumina as may be present in both the iron and in the crucible metals that are to be added later, which materials are gradually eliminated by repeated oxidation, so that the iron portion of the bath metal that is not burned up with aluminum may be separated, re-melted and re-applied with increasing purity for treating subsequent mixtures. The carbon content of the iron, however, plays an unimportant part as long as aluminum continues to be present and also diminishes by release as $CO_2$ with use and re-use of the iron for this purpose. One typical example of a bath metal mixture suitable for the purposes of the invention comprises a mixture with preferably not less than forty percent of copper, and the remainder not less than fifty percent of iron, and iron-group inclusions.

I then melt the contents of the furnace during which operation I skim off the surface oxides, ferrous, alumina, silica, slag, etc., and I regulate the temperature of the furnace according to the melting temperature subsequently desired for metals added later to the bath metal. As a rule, controlled temperatures are obtained more by selecting melting temperatures of metal mixtures of the bath metal than by furnace regulation, although both means are used, as well as pre-heating or even melting of the crucible metals. The most common melting and pouring temperature of the bath metal is approximately 2000 to 2200° F. It is fesible to employ melting temperatures of copper-iron bath mixtures of 1900 to 2500° F. applied to fuse crucible metals, while hot pellets of steel or iron may be used at 2200° F., approximately.

I next provide a quantity of mainly red brass scrap metal having an iron content preferably not over ten percent of the total with a lesser inclusion of aluminum and silicon, which metal mass I call the crucible metal; and this metal is to be processed both in any suitable receiving vessel such as a crucible or the like, and in the furnace.

I then introduce the crucible metal to be processed, into the furnace and submerge it at once into the ferrous bath metal already molten or semi-fluid, and if necessary I may raise the temperature of the furnace again to prevent the bath metal from stiffening too rapidly before fusion of the crucible metal has been accomplished, although I may permit the fusion of the latter to go only as far as plasticity, or further to the point of volatilization, the latter only for extraneous applications of the metallic gases; but as far as possible I accomplish the processing, within the furnace, by reason of direct thermal transfer from the bath to the crucible metal entirely, without direct exposure to high melting zone temperatures. I preferably continue the oscillation of the furnace during the fusion of the entire mass of metals, excepting during the application of the crucible to the bath metal. During this operation the copper component of the iron bath mixture is transferred by confluence to the brass and bronze portions of the melt. Hence, the copper portion of the bath mixture is kept hotter than it could be normally raised in temperature during melting among non-ferrous alloys. Also, the iron portion of the bath metal is brought to a lower temperature than would normally melt iron alone so that combustion of aluminum within a controllable extent is possible to cause a raising of the temperature of the whole mixture while burning out aluminum and silicon inclusions of the brasses and bronzes and thus accomplish fusion of the non-ferrous portion of the scrap or crucible metal so rapidly that oxygen is largely occluded by the molten metal, while the burning aluminum acts as a reducing agent removing free oxygen.

I next await segregation of the iron portion from the other metals within the furnace which is usually completed in less than five minutes from the time the crucible metals are added, after which I may then remove, as by skimming or pouring out of the furnace, as much of the iron metallic group with its inclusions, such as silicon and aluminum and carbon, as may readily be removed alone.

If any iron remains in the furnace, I prefer to allow it to stiffen with accompanying imprisonment of free iron inclusions, and also aluminum and silicon, all captured from the crucible metals as inclusions unwanted therein, and I preferably remove the iron while still very hot and before it sticks to the furnace walls and before it has burned out its alumina and silica contents completely, the latter being preferably removed from the bath metal by re-melting of the iron thereof before re-application of the iron thus recovered as bath metal for subsequent use in treating future scrap metals in the crucible.

I may add to the molten brass and bronze metals thus separated metallic aluminum preferably to the amount of not more than one one-hundredth of one percent of the total non-ferrous mixture content if the original aluminum content of the crucible non-ferrous metal is insufficient, the latter aluminum being present during fusing of the scrap and in sufficient quantity to be diffused throughout the charge, i. e., a substantial dispersion throughout both the brass and iron-group portions segregated from the original scrap mixture. This diffusion of the aluminum among the entire mixture of metals results in intimate displacement of the oxides in solution to reduce them to a substantial degree from the normal saturating point, releasing the oxids as dross to be skimmed off the molten metal; it also serves to remove silicon from the brasses, bronze and iron of the mixture, and from the copper added thereto with the bath metal, so that silica and alumina form and rise to meet the iron. The aluminum thus acts to prevent combining of the iron and the silicon, and in addition, it has a combining power sufficient to prevent recurrence of slag-iron and iron carbide formations in the intermediate non-ferrous ingot and with metal melted therewith.

In view of the greater affinity which the aluminum has for iron than does either the silicon or the carbon, the iron will therefore be attracted away from the silicon or carbon and caused to unite with the aluminum. After the iron-aluminum compound is formed any silicon which may be present will also combine with the metallic aluminum and be removed by oxidation or burning up as aluminum silicate, which burning operation will take place at a temperature very much lower than that at which iron melts. In this manner I thus am able to break up any combination of iron and silicon which would otherwise tend to unite, besides also preventing any combination of iron and carbon which as iron carbide is detrimental to the final casting.

While it is known that aluminum is a great reducer of the oxide of a metal I have found that when this aluminum is added in accordance with the present invention, it permeates the entire furnace charge as a gas and thereby serves to displace the normal oxides of the copper, lead, tin and zinc constituents of the scrap metal, thus interfering with or destroying the normal "cementite" action in the non-ferrous metal. Consequently if a casting were subsequently made from such a material after the aluminum had permeated the entire melt, the destroyed action of the metal oxide would cause the final casting to be porous and to leak, which is the greatly dreaded condition by all foundry men who have learned by past experience to abhor the presence of aluminum in the brasses and bronzes because of this action.

I next pour or draw off from the furnace the remaining metal composed of the original crucible metal and any non-ferrous ingredients either transferred from the original bath metal mixture to the crucible metal, or of those components with metals such as tin, lead, zinc or antimony, or mixtures thereof, added for rectification just before or directly after the iron portion of the bath mixture was removed from the other metals, to enable the desired alloy content of the crucible metal. I then put this new crucible metal, partially processed and preferably solidified, into one or more receptacles adapted for receiving, heating, measuring, dispensing, shaping, or holding molten non-ferrous metals, and, if necessary, I may add any portion of one of my intermediate ingots heretofore described from a previous melt to any or all of the receptacles mentioned, kept hot enough so that its metal contents may disperse the ingredients of the intermediate ingot metal so added, throughout the mixture.

But I preferably add the intermediate ingot to the crucible metals in the furnace along with the bath metal, so that it may be melted by the bath metal when the crucible metal is melted thereby.

If I add phosphorous to the crucible metal I preferably do it after pouring the latter from the furnace, and, if possible, in the absence of iron, unless the latter is added as an alloy to the crucible metals to remain therewith, or unless resolved iron is known to be excessive.

It has been observed that the prior use of phosphorous in such melts results in much of the iron dissolving among the brasses and bronzes, and this practice has caused a considerable part of the previous persistence of iron among these metals, thereby becoming troublesome when so used by picking up silicon to form slag-iron inclusions, or by forming carbide when it could pick up only carbon during direct-fuel or electrical melting. However, the use of phosphorous may be employed with advantage during the application of my process, first, by removing the iron segregated from the crucible metals melted by the bath metal, and then applying the phosphorous along with other alloying constituents desired. In such an instance, it will be found that while the presence of phosphorous among the crucible metals melted by the bath metals is dissipated and spent with its attack upon the iron portion of the bath metal, and then oxidized, the resolved iron either returns eventually to the bath metal iron portion, or gradually diminishes in content due to burning out combined with aluminum.

I then either discard part of the iron first poured out of the furnace, or I recover it entirely for re-application; or I return part of the bath metal iron to re-melting and re-application, and apply the remainder for other purposes, such as inclusions in an end-product ingot, either wholly ferrous, or partly ferrous; the same iron portion of the bath metal recovered being purified by reason of its use as a bath metal after repeated returning to re-melting and re-application for this purpose.

I then dispense the crucible metal from the receptacle, and either cast directly or ingot the metal, preferably completely separated from its ferrous content; and for a dispensing receptacle I prefer the tea kettle variety of ladle to enable drawing off the non-ferrous metal from below the stiffening ferrous portion of the bath metal, if any remains.

In consequence of the use and application of the bath metal in the presence of aluminum I both produce and utilize a more or less pure iron as an intermediate product which has many uses for extraneous application, although I may separate and discard all or part of the iron portion, after it has been applied to the crucible metal, or before such application, if the free iron inclusions captured from the crucible metals are excessive in amounts for use wholly returned to the bath metal when it is re-melted; and I may employ a separate melting means for the ferrous portion of the bath metal using aluminum for improving its condition by reducing silicon thereof.

I preferably produce the intermediate ingot previously described, when I utilize the bath metal described, and when silicon and aluminum are both present, they naturally combine and in that form are easily burned out by way of transfer to the bath metal, or by way of transfer into the crucible metal, which is subjected to the second melting when the ingot metal intermediate is melted for casting, and to elimination of silicon and aluminum in consequence; but I may utilize the intermediate ingot produced for the purposes described, by employing conventional melting methods throughout, though preferably the electrical melting furnace.

It will of course be understood that other equally feasible methods may be utilized to quickly melt the scrap material in order that the lead, tin and zinc constituents thereof, which fuse at a moderate temperature, will not be consumed by combustion or be volatilized. For example, it is feasible to load the scrap into a suitable receiving vessel or crucible and then to accomplish melting of this scrap by pouring hot or molten iron over it. In this instance a pre-heated crucible is sometimes preferred. By using molten iron in accordance with this invention it quickly melts brasses and bronzes which have a lower melting temperature than iron, and the quantity which I use is such that it gives up so much of its heat that the ferrous bath metal begins to stiffen as it congeals in this form it rises upon the molten brass or bronze and is quickly removed either by raking it out of the pot or by drawing off the brass or bronze beneath it, as by means of the tea kettle dispensing ladle heretofore mentioned. In this way, the iron used for melting the brass or bronze is again quickly separated and recovered from the melt since all of the free iron in the scrap rises to the top where it clings to the congealed iron. This operation practically removes substantially all of the free iron from the mixture and so quickly melts the brass or bronze crucible metal that practically none of the tin, lead and zinc present is consumed. Thus, the solidified melt will be practically free from unwanted inclusions of any kind.

In accordance with the first stage of my process it will be found that the aluminum oxide in quantities greater than saturation and temperature permit in solution, float to the top of the molten brass or bronze melt and is skimmed off. However, the intermediate ingot contains the aluminum in both metallic and oxidized form but in which the "cementite" action of the zinc, tin, copper and lead oxides of the solidified mass is destroyed. This "cementite" action is re-formed by restoration of normal oxids in solution and the crucible metal entirely purged of aluminum which is burned out by subjection to the temperature of re-melting.

By means of the present method of re-melting and casting the intermediate ingot product, a greater bulk of tin, lead and zinc is kept from being volatilized by reason of their occlusion while fusing under the iron-copper mixture, than the ordinary time and temperature melting conditions in use permit. For instance, an iron-copper mixture at 2000° F. will, upon being poured over a crucible content of the brass or bronze scrap, give a molten crucible mixture in melting range from prasticity to high fluidity the respective temperatures of which being from about 800° to 950° F. during plasticity of the type desired, and from about 950° to 1100° F. if barely fused. The latent heat of fusion of metals melted by the bath metal is an important factor controlling the ultimate temperature of the crucible metal melted with it. For this reason, not even relatively small amounts of cold crucible metals approach anywhere near the temperature of the bath metal when melted thereby.

In accordance with this invention, I have provided an improved process for manufacturing brass and bronze castings from impure metal scrap which eliminates much of the hand labor incidental to diligently removing iron, silicious and aluminous alloys from miscellaneous brass and bronze alloys mixed together in scrap form, and it may dispense with magnetic devices for removing iron turnings; and it also enables melting together metal alloys grouped for the objectives of getting the desired constituents in the crucible metal, instead of separating metals and re-grouping them according to what amounts of destructive oxidation they will stand from past methods of purifying these metals.

Moreover, by employing this method I accomplish direct thermal transfer from the bath metal to cause fusion or melting of the crucible metal scrap or ingot, during which operation there results occlusion of oxygen and control of oxidation of the aluminum, silicon and iron during fusion or melting of the crucible metal; dispersion of aluminum and silicon accompanied by exchange of both between the crucible and the bath metals; dispersion of other concentrations such as nickel; release of free iron from the crucible metals and capture therefrom by the bath metal iron portion; avoidance of destructive melting temperatures for conserving tin, zinc and lead constituents of the brasses and bronzes; and a rapid and economical melting operation as to off-set any departure from standard foundry procedure occasioned by the use of two melts in the foundry; and finally, the ability to use the preferred electrical melting method more economically in melting a predominantly ferrous, instead of a non-ferrous mixture, meaning its use in melting the bath metal.

It will now be apparent that by my process I am able to utilize the presence of aluminum and silicon among the brasses and bronzes not only by reason of the cooperation between the former substances and iron, but also by reason of providing for two outlets and one by-pass of alumina and silica, which are described as follows: first, an outlet by way of the bath metal and by re-melting the latter; second, a by-pass by way of the intermediate ingot instead of direct casting; third, an outlet by way of the re-melting of the intermediate ingot with completion of the oxidation through non-ferrous channels.

It is to be understood that the use of the intermediate aluminum-bearing ingot does not necessarily accompany the presence of free iron, but it represents primarily a device for preventing the combination of any iron that may later be admitted to the brass or bronze from combining with either silicon or carbon. Also, I may utilize the iron bath metal for accomplishing rapid fusion of pure brass or bronze with controlled oxidation and salvaging of tin, zinc, and lead, and then pour into direct end-products castings instead of ingotting; or I may then add aluminum and ingot the intermediate product then made.

In the event, however, that the crucible metal and the purified bath metal iron, and any other metal constituent of the bath metal are so nearly free of aluminum and silicon as to be able to ingot or cast for all general foundry purposes either the ingot or the castings become end-products, suitable for use as pure ingot metal would be suitable to cast or ingot, in conventional practices, or if the silicon content of the metals is adapted for end-product use, with the aluminum content negligible, or usefully applied, then the metal either cast or ingotted becomes an end-product.

If I re-melt the intermediate ingot non-ferrous metal, it will be modified thereby by the incidental oxidation preferably accompanying the use of either direct-fuel or the electrical melting methods, and it will be rendered practically free of alumina and silica when re-melted mainly for purpose of improving its own metal content thereby; the same alumina and silica contents being not over one-half of one percent in the intermediate ingot before re-melting; but if the said alumina and silica contents are in excess of five-tenths of one percent of the intermediate ingot metal content, then the metal of the intermediate is preferably melted along with other metals for the purposes of preventing slag-iron and iron-carbide inclusions, and dispersion of other inclusions within the intermediate ingot among the end-products.

By the term "aluminum bearing dross" as employed in the specification and claims, I mean in some instances to describe the insoluble compounds of aluminum metal with the component metals oxids which tend to rise and to be lost by skimming the molten metals and hence are of a drossy character and, in other instances, I intend the term to designate this same compound as partially oxidised aluminum in combination with component metal oxids of the alloyed brasses or bronzes. It is to be understood that the phase of the process described herein which depends upon the action of aluminum combined with the oxids mentioned is accomplished both by the initial action of aluminum in throwing the oxids out of solution and by the ability of the aluminum bearing dross to give up its aluminum and combine with iron, silicon, etc.; and that this process could not be carried out without the generation and application of the aluminum bearing dross against the reactions of carbon, silicon and iron in remelted metals; nor could it be carried out without conserving within the melted brass as much of the insoluble aluminum bearing dross as may be accomplished by the melting methods described and by uses of the temperatures of the molten metals described and claimed. It is further understood that melting temperatures and temperatures of remelting are the steps of controlling the liquidity or fluidity of the treated brasses and bronzes and that these states of the metal control almost entirely the opportunity to conserve the drossy aluminum bearing compound as the active agent for re-applying aluminum in avoidance of upsets in the crystalline metal structures, which is so easily lost by escape to the top of molten metal, if the metal is hot and liquid enough to enable the dross to rise.

Having thus described my invention, what I claim as new and desire to secure by Letters Patent is:

1. The process of treating mixtures of predominately non-ferrous metals for preventing combinations of slag-iron and iron-carbide among brasses or bronzes, comprising the steps of melting a mixture of mainly brass or bronze in the presence of aluminum in an amount that its content be not more than one one-hundredth of one percent of the total non-ferrous mixture content to be diffused throughout the mixture, casting the mixture into ingot form with demonstrable upset of the cementite of the crystalline structure upon fracture to render it unfit for the manufacture of pressure-subjected castings, and thereafter melting the intermediate metal ingot to thereby demonstrably restore the cementite function and converting the intermediate ingot into end-product form, both of said products being immune to slag-iron and iron-carbide formations by reason of the burning out of silicon and release of iron from silicon and carbon combinations in the presence of minute quantities of aluminum, said brass or bronze alloy end-product being freed of aluminum and iron to the extent of restoration of normal structure of the brass or bronze metal.

2. The process of treating mixtures of predominately non-ferrous metals for the prevention of slag-iron and iron-carbide combinations within the treated metal and in mixtures of the treated metal and added non-ferrous metal melted together, which comprises the steps of melting a mixture of mainly brass or bronze having either a silicon and an aluminum content initially present or an aluminum content added to the molten metal in a quantity that its content be not more than one one-hundredth of one percent of the total non-ferrous mixture content to cause an upset in the cementite function of the metal demonstrable upon fracture, casting the treated metal into ingot form, and thereafter melting the treated metal along with added brass or bronze to thereby restore the cementite function of the brass or bronze constituents and prevent combinations of iron with silicon and carbon by reason of the higher combining affinity of iron and aluminum over the affinity of iron toward silicon and carbon.

3. The method of treating a non-ferrous metal mixture composed mainly of brass or bronze with minor additional metals, which comprises adding thereto a molten metal mixture composed mainly of iron and with a lesser portion of copper with direct thermal transfer to melt the non-ferrous mass and to control oxidation among the entire group of metals during conversion.

4. An intermediate ingot composed mainly of brass or bronze and having an aluminum content, not essentially a working component of the alloy and of less than one one-hundredth of one percent thereof to cause definite temporary prevention of the normal function of the cementite of the metal to thereby render the metal of the ingot unsuitable for pressure subjected castings instead of ingotting, said ingot metal being immune to the formation of slag-iron and iron-carbide combinations until the aluminum content is burned out by subsequent melting, and in which the said interruption of the cementite function is restored by the subsequent melting of the ingot to render the intermediate ingot metal suitable for all casting purposes of the alloy as an end-product.

5. An intermediate ingot composed mainly of brass or bronze and having an aluminum content, not a working component of the alloy, and of less than one one-hundredth of one percent thereof to cause a pronounced upset in the crystalline structure of the metal of the ingot and to be dispersed among additional metal melted therewith with sufficient combining capacity to prevent slag-iron and iron-carbide combinations among the entire mixture of the ingot and added metal, said aluminum content being sufficiently dilute and dispersed to enable its elimination by oxidation during the subsequent melting of the intermediate metal and added metal with restoration of the cementite function of the entire mixture.

6. The process of removing free iron parts from heterogeneous metal mixtures of mainly brass or bronze which comprises the steps of melting to at least a semi-fluid state the entire mixture, except the iron parts, removing by raking or screening most of the unmelted iron portions, and thereafter recovering the brass or bronze from the remaining iron parts by segregation of and removal of the iron particles remaining with the use of added iron in the molten state applied to the top of the molten brass or bronze.

7. The process of purifying predominantly non-ferrous metal mixtures consisting mainly of brasses or bronzes contaminated with inclusions of iron, silicon and aluminum which comprises providing a high aluminum content, heating the brass or bronze to a fluid condition in the presence of said aluminum content with the aluminum in sufficient quantity to effect combination of the aluminum with substantially all the iron and the silicon existing within the metal mixture so as to prevent combinations of iron, silicon and carbon.

8. The method of treating brass or bronze alloy metals which comprises rapidly melting the brass or bronze by direct thermal contact with a molten metal having a higher melting temperature than that of standard brasses and bronzes to render them fluid and to prevent removal therefrom by oxidation of the major constituents of the brass or bronze alloys.

9. The process of melting, refining and recovering brass or bronze mixtures from miscellaneous scrap containing ten percent or less of dissolved and free iron parts, which comprises the steps of first melting the entire mixture excepting the free iron parts not fusible under the conditions at a temperature of between 1800° and 2500° F. in the presence of five percent of the total mixture in aluminum bearing dross generated and conserved from a previous melting of brass in the presence of aluminum metal, then raking off the unmelted iron parts and other rejected oxids floating on the molten metal including an excess of aluminum bearing dross that is also insoluble in the molten brass or bronze, and then casting the treated metal into end products of demonstrably normal crystalline metal structure and having a dissolved iron content reduced from the average of the initial scrap mixture and having a demonstrable freedom from the presence of either iron carbide or iron silicon combinations.

10. The process of melting, refining and recovering brass or bronze resultants from miscellaneous mixtures of predominantly brass or bronze scrap mixtures containing ten percent of dissolved and free iron with more or less silicon and other metals of no significance in this process, which comprises the steps of first melting the entire mixture excepting free iron not fusible under the conditions with a mixture of copper and iron in about equal parts and applied at a temperature between 2000° F. and 3000° F. for direct thermal transfer therefrom to the treated metal with the copper content of the melting copper-iron mixture added to the brass or bronze resultant by confluence, in the presence of five percent of aluminum bearing dross, then skimming off the excess of the said dross along with the floating free iron parts and associated oxids and burned metallic compounds, alumina and silica, and then pouring into end products castings, the temperature of the treated metal at pouring being between 1800 and 2300° F.

11. The process of refining brass or bronze metals with reduction and control of deleterious dissolved iron, silicon and carbin entering thereinto during foundry operations which consists in preparing intermediate ingots of brass or bronze having a maximum content of aluminum bearing dross conserved for application of the aluminum content thereof against reactions of the said iron and silicon contents with prevention of combination of the said iron and carbon and prevention of upset in the metal structure of both the said intermediate ingot and metal melted along therewith for the aforementioned purposes, then melting the final mixture of said intermediate ingot along with the added metal, and then pouring the new mixture into end products castings.

12. An intermediate ingot for use in a process for melting and refining brass or bronze metals whereby the said brass or bronze may be protected from the formation of iron-silicate and iron-carbide combinations during melting operations, said ingot containing a major content of aluminum bearing dross and a minor content of brass or bronze metal as a binder for the said active purifying agent aluminum bearing dross.

13. An intermediate ingot containing at least fifty percent of aluminum bearing dross bound with a content of brass or bronze as low as twenty percent, wherein said brass or bronze content acts as a binder for a maximum of aluminum bearing dross for the purpose of obtaining the greatest possible active and harmless combining strength of the reactions of its aluminum content against silicon and iron ingredients amongst the brasses or bronzes melted along with the said ingot for purposes of this process.

14. An intermediate ingot composed predominately of brass or bronze and having an aluminum bearing dross content of one percent or less associated with an equal amount of unimportant oxides and dissolved iron, silica and alumina, the said ingot being composed for the purpose of remelting and thereby refining the said content of brass or bronze.

15. An intermediate product ingot consisting of mainly pure metallic iron mixed with a minor quantity of aluminum bearing dross acquired by reason of use of the iron which has contacted plastic brass or bronze in the presence of generation of aluminum bearing dross under temperature conditions that favored retention of the said dross instead of complete burning out of the aluminum.

16. An intermediate product ingot consisting of mainly a mixture of copper and iron in even proportions and a minor content of aluminum bearing dross acquired by reason of the use of the copper-iron mixture under temperature conditions that favored retention of the said dross instead of complete burning out of the aluminum content.

17. The process of converting mixtures composed predominately of pure ingot metal brass or bronze alloys and containing an aluminum bearing intermediate ingot along with the pure ingot metal of substantially the same alloy to produce a non-ferrous end-product and a ferrous end-product, comprising the steps of first heating to at least a semi-fluid state a quantity of bath metal consisting of a mixture of mainly pure metallic iron and of copper in about equal proportions, said copper being intended for final transfer to the brass or bronze resultant mixture finally recovered and being used for the purpose of lowering the melting point of the bath metal, then maintaining the said iron-copper mixture in a heated condition and adding to the bath metal mixture as much brass or bronze mixture as will readily become fluid as a consequence of direct thermal transfer thereto from the bath metal, then awaiting fluidity and action of the iron portion upon the entire mixture to which the copper portion is added by confluence, then separating the iron portion of the bath metal along with inclusions of oxids and metallic ingredients added to the iron during the treatment by segregation of the iron from the non-ferrous mixture, then recovering the segregated iron portion with its inclusions mentioned as a ferrous intermediate product for partial re-use as a subsequent component of the iron-copper mixture, then casting or ingotting the brass or bronze resultant mass remaining and recovered as an end-product, and finally remelting the ferrous intermediate-product recovered to burn out its non-ferrous ingredients if any remain and thereby convert the iron portion so treated into an end-product.

18. An end product ingot consisting of mainly pure metallic iron and a content of aluminum bearing dross sufficient to react upon dissolved iron and upon silicon in brass or bronze mixtures subjected to treatment by application of the said end-product ingot for direct thermal transfer to the said brass or bronze while both the ingot and the brass or bronze are subjected to a temperature between 1500° F. and 3500° F.

19. An end-product ingot composed of a mixture of mainly pure iron and of copper containing ten percent or less of aluminum bearing dross, the said ingot being composed for the purpose of heating and applying to non-ferrous metal mixtures of mainly brass or bronze compositions for treatment thereof.

20. In a process of converting brass or bronze involving melting or heat treatment, the method of refining the brass or bronze which consists in performing the process with or after introduction of aluminum bearing dross into the brass or bronze, the said dross being composed mainly of loosely attached atoms of aluminum combined with the oxides of non-ferrous metals such as brass alloy constituents, as opposed to inert alumina or silica, the said aluminum atom being detachable for reaction against silicon and iron under temperature conditions adapted to favor this reaction of aluminum bearing dross against silicon and iron.

GEORGE H. GOLDSMITH.